US005320373A

United States Patent [19]

Robertson et al.

[11] Patent Number: 5,320,373

[45] **Date of Patent: * Jun. 14, 1994**

[54] MOLDED-COMPOSITE CHASSIS FOR A WHEELCHAIR

[75] Inventors: A. Scott Robertson, San Francisco; Richard Geiger, Fremont; Robert W. Lishman, LaSelva Beach, all of Calif.

[73] Assignee: Medical Composite Technology, Aptos, Calif.

[ * ] Notice: The portion of the term of this patent subsequent to Jan. 5, 2010 has been disclaimed.

[21] Appl. No.: 839,069

[22] Filed: Feb. 20, 1992

Related U.S. Application Data

[63] Continuation of Ser. No. 528,595, May 24, 1990, abandoned.

[51] Int. Cl.[5] .............................................. B62M 1/14

[52] U.S. Cl. ............................ 280/250.1; 280/304.1; 297/353; 297/337; 297/DIG. 4

[58] Field of Search ............... 280/250.1, 304.1, 242.1, 280/647, 650; 297/353, DIG. 4, 337; 403/230, 231

[56] References Cited

U.S. PATENT DOCUMENTS

| | | | |
|---|---|---|---|
| Re. 32,242 | 9/1986 | Minnebraker | 280/242 WC |
| D. 254,970 | 5/1980 | Honzyou | D12/131 |
| D. 278,217 | 4/1985 | Nassiri | D12/131 |
| D. 294,476 | 3/1988 | Michel et al. | D12/133 |
| D. 300,733 | 4/1989 | Wagner | D12/131 |
| D. 304,815 | 11/1989 | Jones | D12/133 |
| D. 305,318 | 1/1990 | Danecker | D12/131 |
| 774,042 | 11/1904 | Cooper . | |
| 1,620,675 | 3/1927 | Herold . | |

(List continued on next page.)

FOREIGN PATENT DOCUMENTS

| | | | |
|---|---|---|---|
| 501986 | 5/1954 | Canada . | |
| 0312969 | 4/1989 | European Pat. Off. | 280/250.1 |
| 2731952 | 1/1978 | Fed. Rep. of Germany | 280/250.1 |
| 883578 | 7/1943 | France . | |
| 451392 | 8/1936 | United Kingdom . | |
| 939012 | 10/1963 | United Kingdom . | |
| 2226095 | 6/1990 | United Kingdom | 280/281.1 |

OTHER PUBLICATIONS

International Search Report, completed Sep. 8, 1991, mailed Sep. 24, 1991. Application No. PCT/US91/03694.

*Primary Examiner*—Margaret A. Focarino
*Assistant Examiner*—Paul Dickson
*Attorney, Agent, or Firm*—Burns, Doane, Swecker & Mathis

[57] ABSTRACT

A chassis is provided having two longitudinal sides, one or more cross-bars between the sides, and two torsion forwardly and downwardly extending arms terminating in sleeves for holding snap-in casters. When attached to the other wheelchair components, the arms create a space therebetween and under the wheelchair seat for storage of optional items. The molded chassis may be tailored to performance specifications and is constructed from composite material, preferably by compression molding using sheet molding compound or by resin transfer molding. Shock and vibration attenuating characteristics are selectable and the chassis sides may be of one or multiple piece construction. Each longitudinal side includes two vertically extending posts for attaching a seat, the posts providing a height, seat pan angle and center of gravity adjustment mechanism for the seating system relative to the chassis. The drive wheels are attached to camber plugs which are secured within recesses in the sides. The camber plugs are interchangeable and include a variety of selected camber angles. In another aspect of the present invention, the cross-bars are of adjustable width thereby permitting the width of the chassis to be adjusted to accommodate users of different sizes, and to accommodate different sized seating systems. In an additional aspect of the invention, the chassis disassembles into two halves, the two halves connected by cross-bars of a preselected length. In one additional aspect, seat mounting rails are attached within an inner surface of the longitudinal sides. The chassis may attach a variety of seating systems, including one piece composite seats.

11 Claims, 8 Drawing Sheets

U.S. PATENT DOCUMENTS

| | | | |
|---|---|---|---|
| 1,851,843 | 12/1928 | Inman . | |
| 2,010,306 | 8/1935 | Leech | 155/94 |
| 2,022,348 | 11/1935 | Hoerle | 208/181 |
| 2,797,738 | 7/1957 | Patterson | 155/88 |
| 2,859,837 | 11/1958 | Mize | 188/2 |
| 3,189,385 | 6/1965 | Mommsen | 297/429 |
| 3,243,194 | 3/1966 | Trusock | 280/43.12 |
| 3,337,261 | 8/1967 | Nihlean et al. | 297/44 |
| 3,416,837 | 12/1968 | Saunders | 297/195 |
| 3,486,727 | 12/1969 | Timms | 248/397 |
| 3,882,949 | 5/1975 | Anderson | 180/8 A |
| 3,937,490 | 2/1976 | Nasr | 280/242 WC |
| 4,082,348 | 4/1978 | Haury | 297/45 |
| 4,101,143 | 7/1978 | Sieber | 280/42 |
| 4,166,631 | 9/1979 | Sanaski | 280/242 WC |
| 4,169,626 | 10/1979 | Hollar, Jr. | 297/365 |
| 4,243,339 | 1/1981 | Dickerson | 403/4 |
| 4,350,227 | 9/1982 | Knoche | 188/2 F |
| 4,351,540 | 9/1982 | Minnebraker | 280/242 WC |
| 4,360,213 | 11/1982 | Rudwick et al. | 280/242 WC |
| 4,371,183 | 1/1983 | Dion | 280/42 |
| 4,380,343 | 4/1983 | Lovell et al. | 280/242 WC |
| 4,392,690 | 7/1983 | Anderson | 301/121 |
| 4,405,142 | 9/1983 | Whetstine | 280/242 WC |
| 4,422,660 | 12/1983 | Costello et al. | 280/242 WC |
| 4,428,594 | 1/1984 | Minnebraker | 280/242 WC |
| 4,477,098 | 10/1984 | Minnebraker | 280/242 WC |
| 4,477,117 | 10/1984 | Higgs | 297/45 |
| 4,483,653 | 11/1984 | Waite | 414/541 |
| 4,486,048 | 12/1984 | Meyer | 297/433 |
| 4,489,955 | 12/1984 | Hamilton | 280/242 WC |
| 4,500,102 | 2/1985 | Haury et al. | 280/242 WC |
| 4,500,112 | 2/1985 | Raidel | 280/693 |
| 4,506,901 | 3/1985 | Tosti | 280/242 WC |
| 4,570,756 | 2/1986 | Minnebraker et al. | 188/2 F |
| 4,572,756 | 2/1986 | Minnebraker | 297/429 |
| 4,589,525 | 5/1986 | Phipps et al. | 188/2 F |
| 4,592,570 | 6/1986 | Nassiri | 280/650 |
| 4,593,929 | 6/1986 | Williams | 280/650 |
| 4,595,212 | 6/1986 | Haury et al. | 280/242 WC |
| 4,598,921 | 7/1986 | Fenwick | 280/242 WC |
| 4,607,860 | 8/1986 | Vogel | 280/650 |
| 4,648,619 | 3/1987 | Jungnell et al. | 280/650 |
| 4,664,441 | 5/1987 | Collins | 297/183 |
| 4,676,519 | 6/1987 | Meier | 280/242 WC |
| 4,679,816 | 7/1987 | Riikonen | 280/650 |
| 4,693,490 | 9/1987 | Loodberg et al. | 280/650 |
| 4,721,321 | 1/1988 | Haury et al. | 280/242 WC |
| 4,724,115 | 2/1988 | Freeman | 264/513 |
| 4,730,842 | 3/1988 | Summers et al. | 280/638 |
| 4,744,585 | 5/1988 | Huang | 280/646 |
| 4,749,064 | 6/1988 | Jinno et al. | 188/2 F |
| 4,754,987 | 7/1988 | Williams | 280/289 WC |
| 4,768,797 | 9/1988 | Friedrich | 280/242 WC |
| 4,770,432 | 9/1988 | Wagner | 280/242 WC |
| 4,805,925 | 2/1989 | Haury et al. | 280/250.1 |
| 4,813,693 | 3/1989 | Lockard et al. | 280/42 |
| 4,828,781 | 5/1989 | Duplessis et al. | 264/250 |
| 4,840,390 | 6/1989 | Lockard et al. | 280/250.1 |
| 4,852,899 | 8/1989 | Kueschall | 280/250.1 |
| 4,863,771 | 9/1989 | Freeman | 428/36.1 |
| 4,887,826 | 12/1989 | Kantner | 280/250.1 |
| 4,887,830 | 12/1989 | Fought et al. | 280/304.1 |
| 4,889,355 | 12/1989 | Trimble | 280/281.1 |
| 4,891,176 | 2/1990 | Drysdale et al. | 264/250 |
| 4,902,458 | 2/1990 | Trimble | 264/46.6 |
| 4,917,395 | 4/1990 | Gabriele | 280/250.1 |
| 4,921,271 | 5/1990 | Berry et al. | 280/661 |
| 4,926,777 | 5/1990 | Davis, Jr. | 114/270 |
| 5,020,816 | 6/1991 | Mulholland | 280/250.1 |
| 5,028,065 | 7/1991 | Danecker | 280/250.1 |
| 5,131,672 | 7/1992 | Robertson et al. | 280/250.1 |
| 5,176,393 | 1/1993 | Robertson et al. | 280/250.1 |

MOLDED-COMPOSITE CHASSIS FOR A WHEELCHAIR

This application is a continuation of application Ser. No. 07/528,595, filed May 24, 1990, now abandoned.

FIELD OF THE INVENTION

The present invention relates to wheelchairs. More specifically, the present invention relates to a light weight wheelchair chassis made of fiber reinforced resin material.

BACKGROUND OF THE INVENTION

Wheelchairs are well known transportation appliances enabling the infirm, disabled and unwell person to move about with greater mobility than otherwise. Essentially, wheelchairs are small, single person conveyances typified by a chair supported by two outer, large drive wheels behind the center of gravity of the user, and with two smaller swivel mounted wheels or casters located toward the front. Motive power may be supplied by an attendant pushing the wheelchair, by the user's hands and arms applied to the drive wheels, or by an auxiliary power source.

While wheelchairs following many different designs have proliferated, there have been drawbacks heretofore that remain to be solved. In order to meet the needs and demands of the physically handicapped user, wheelchairs must be versatile and easily and readily adapted to accommodate the particular body shape and size of the user. Wheelchairs must also be versatile in adapting to both ambulatory and recreational travel, and they must be sufficiently rugged and durable to provide comfortable passage over uneven and irregular surfaces.

For instance, an unsolved need has arisen for shock and vibration attentuation control for providing extended opportunities and mobility to the user. Another unsolved need has been for a universal, adjustable chassis. Yet another unsolved need has been to provide a more fully collapsible and detachable chassis for a modular wheelchair whereby the wheelchair may be disassembled and stowed in weight and volume limited areas, such as in an overhead storage compartment of an airplane.

Yet another unsolved need has been for a chassis for a modular wheelchair which may be customized to the body shape, comfort and needs of a particular patient by a therapist with simple adjustments without special skills, tools or training. One more unsolved need has been for a more universal chassis for a wheelchair with which a variety of application specific seating system designs may be readily and interchangeably used with one wheelchair chassis without any modification to the chassis or other impairment.

SUMMARY OF THE INVENTION WITH OBJECTS

A general object of the invention is to provide a chassis for a wheelchair that overcomes the limitations and drawbacks of the prior art.

A specific object of the invention is to provide an adjustable light weight chassis for a wheelchair.

A further object of the invention is to provide a chassis for a wheelchair that enables the components of the wheelchair to be easily assembled and disassembled.

Yet another specific object of the present invention is to provide a chassis for a wheelchair enabling the wheelchair to be easily taken apart and stored in volume and weight limited areas, such as the overhead compartment of an airplane.

Another specific object of the present invention is to provide a chassis for a wheelchair having improved shock and vibration protection.

One more specific object of the present invention is to provide a chassis for a wheelchair that may be easily adapted for use with other standard wheelchair components.

Still one more object of the present invention is to provide a chassis for a wheelchair constructed from shock and vibration attenuating materials.

Yet one more object of the present invention is to provide a chassis for a wheelchair having torsion arms, a space being created between the arms and beneath the wheelchair seat for the storage of optional equipment, such as power packs or storage bags.

Still another object of the present invention is to provide a chassis for a wheelchair whose component parts are formed of fiber reinforced resin material.

In accordance with the principles of the present invention, a unitary chassis is provided having two longitudinal sides, at least one cross-bar between the sides, and two torsion arms extending forwardly and downwardly from the sides and terminating in sleeves for holding casters. When attached to the other wheelchair components, the torsion arms create a space between the arms and beneath the wheelchair seat for storage of optional items.

The molded chassis sides are constructed from shock and vibration attenuating material, such as a glass fiber reinforced polymerized epoxy resin or other suitable material preselected in conformity with the desired specifications of the chassis, using molding techniques. Each chassis side may be formed in one or two side portions by compression molding using a sheet molding compound. Two-portion side construction is preferred and the portions may be molded as a left segment and a right segment that are joined vertically, or as an upper segment and a lower segment that are joined horizontally. The selected sheet molding compound is placed into heated, pressurized compression molds until cured. Metal parts or elements may be placed into the molds prior to curing, or bonded to the chassis following curing. The chassis sides and cross-bars are of a generally hollow construction or may be foam filled and/or reinforced with bonded-in ribs. The ribs may also be integrally formed with the sides, or separately formed and attached by suitable bonding or attachment techniques.

Each chassis side may also be constructed in one piece from composite materials using resin transfer molding, reinforced reaction injection molding, structural reaction injection molding, hand layup over foam techniques, and hand layup with internal pressure techniques.

A generally C-shaped hollow rear cross-bar of metal or composite material may be included in the chassis and may be fitted with optional battery operated electric drive motors for independently driving the drive wheels of the wheelchair.

In one aspect of the invention, each longitudinal side accommodates two vertically extending posts for attaching a seat, the posts providing an independent height adjustment mechanism for enabling the height or angular position of the seating system to be adjusted relative to the chassis or to the floor plane. The height adjustment mechanism comprises a plurality of telescoping members securable at adjustable extensions relative to the chassis, the frame of the seating system being attached at the ends of the telescoping members. Each telescoping member includes an attachment device for engaging a selected portion of the of the frame of the seating system, and a locking pin is provided for locking the frame portion to the attachment device at one of a predetermined plurality of longitudinal positions, thereby facilitating the forward and rearward adjustment of the seating system relative to the chassis of the wheelchair. Also, within this aspect of the invention the plurality of telescoping members enables adjustment of the angle of attachment of the seating system to the chassis.

In another aspect of the invention, each longitudinal side further includes a recess containing a mounting plate for attaching the drive wheels.

In one more aspect of the present invention, the cross-bars may be of adjustable or alterable length thereby permitting the width of the chassis to be adjusted to accommodate users of different sizes, to accommodate different sized seating systems, to permit the wheelchair to pass through restricted spaces, and to permit the wheelchair to be folded for storage. In this aspect the chassis may be disassembled into two pieces thereby increasing the collapsibility of the wheelchair.

In an additional aspect of the present invention, the two side portions of the chassis sides are molded and subsequently joined by cross-bars of a preselected length thereby enabling the wheelchair to be customized to any user's width.

In yet another aspect of the present invention, mounting rails for attaching the wheelchair seat may be attached to the two sides of the chassis.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings.

FIG. **5*a* is a cross sectional, enlarged frontal view of the wheel attachment mechanism of the chassis and taken along the lines 5—5 in FIG. 4.

FIGS. **6*a* through 6*d*** show a series of interchangeable drive wheel attachment plugs for securing the drive wheel to the drive wheel attachment mechanism of the chassis.

Figure 7:
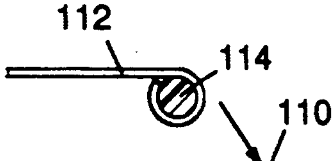
Figure 7:
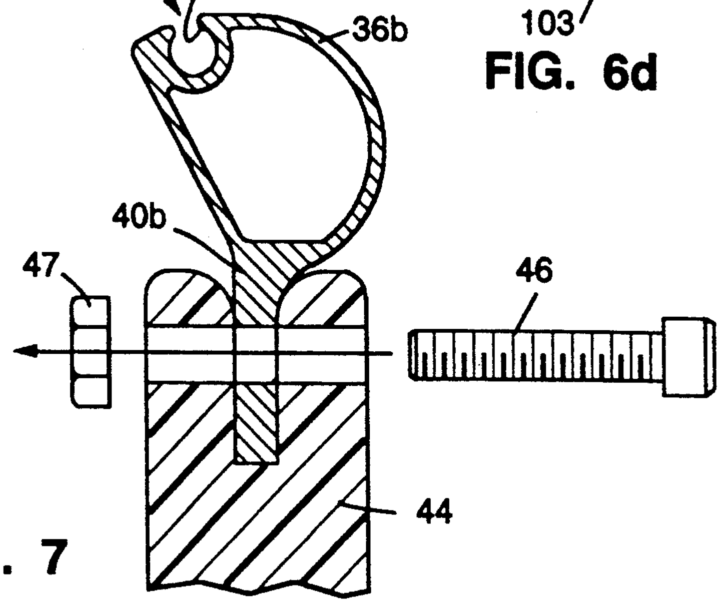

FIG. 7 is an enlarged front sectional view of the chassis seat mounting mechanism and also showing the mechanism for attachment of fabric seating material to the seat.

Figure 1:
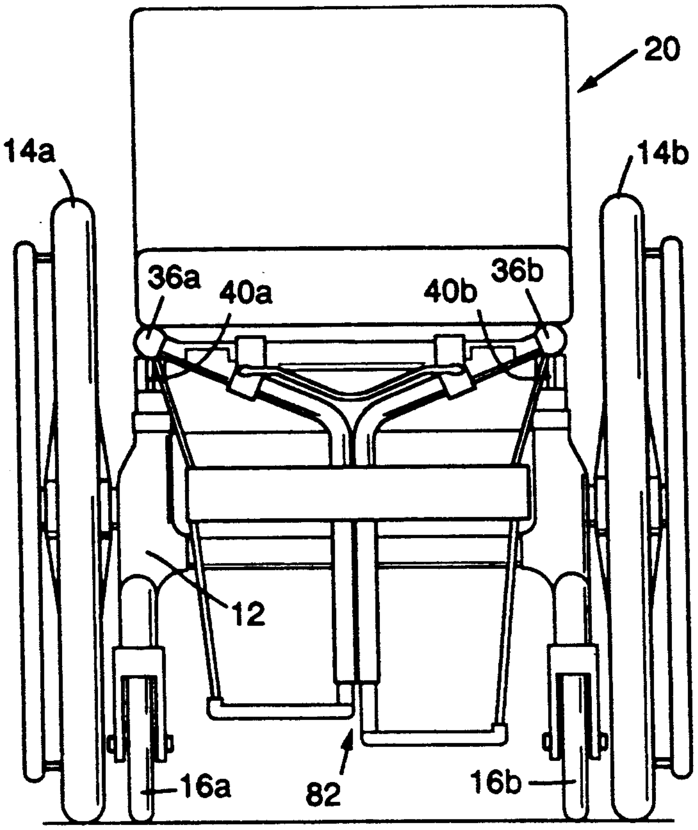
FIG. 1 is a front view in elevation of a wheelchair incorporating a chassis of the present invention.
Figure 8:
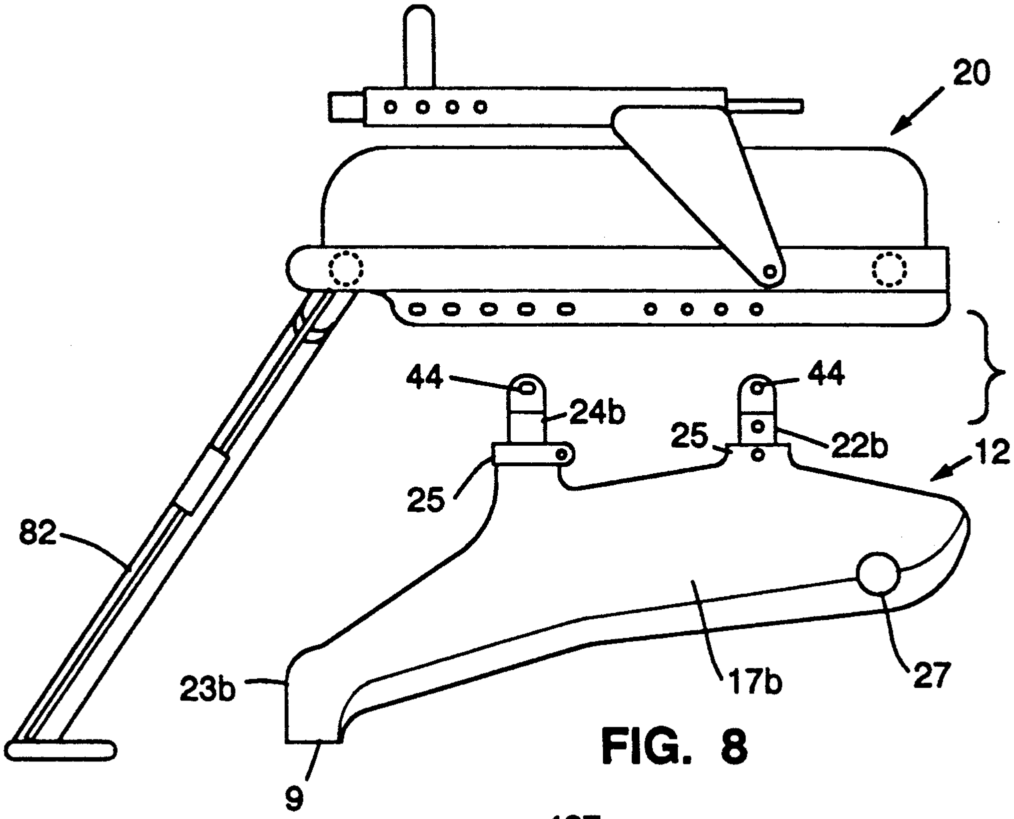

FIG. 8 is a somewhat diagrammatic side view in elevation of the FIG. 1 chassis detached from the seating system, with the seat back folded down against the seat cushion, with the leg and foot rest extending downwardly and outwardly in a normal use position, and showing the posts for attachment of the seating system.

Figure 9:
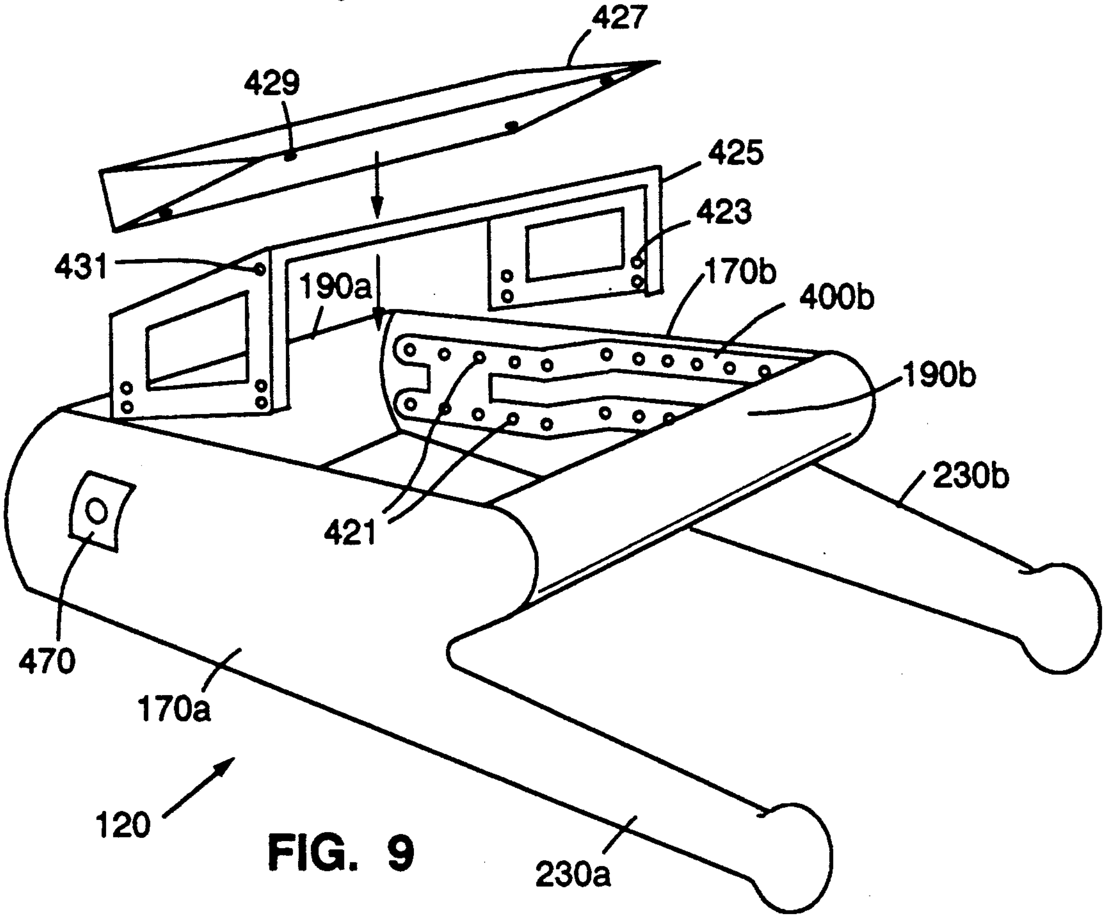

FIG. 9 is a perspective view in elevation of an aspect of the present invention wherein mounting rails are attached to the chassis to mount the wheelchair seat.

Figure 10:
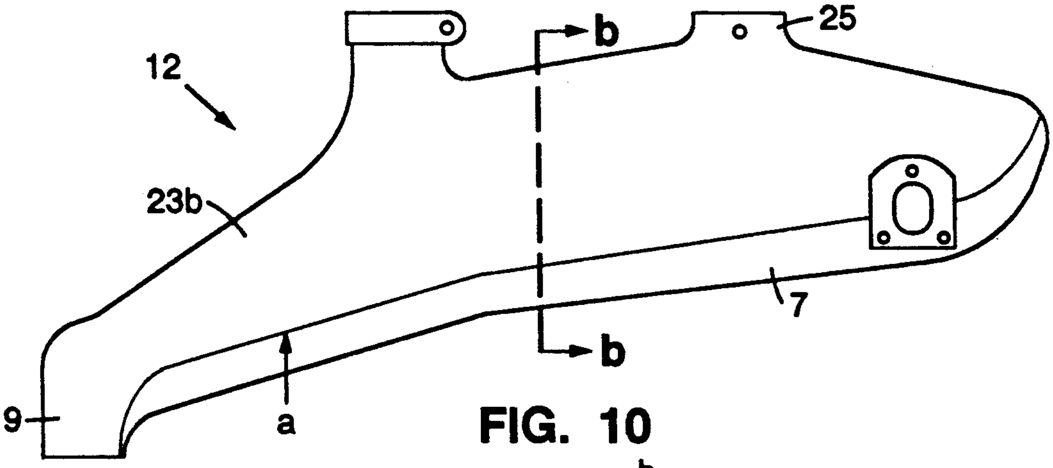
Figures 10A, 10B, 10C:
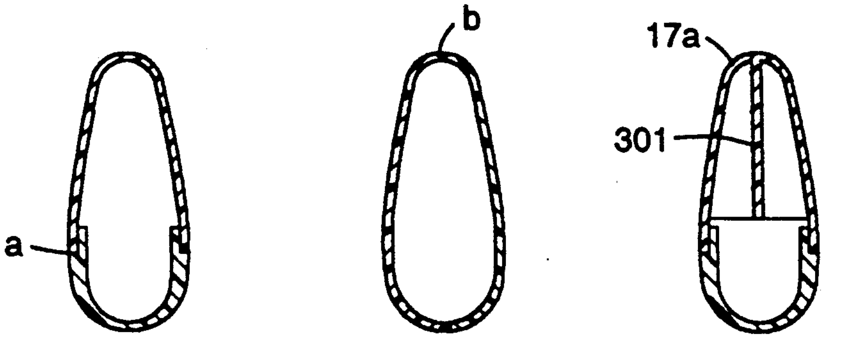
Figure 10D:
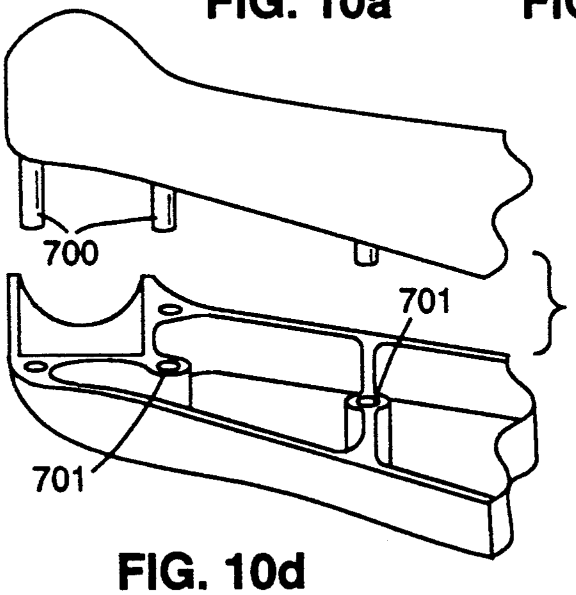

FIG. 10 is a side view of an embodiment of the present invention having an eleastomer cover bonded to the bottom of the chassis and showing two joint lines for joining the two segments of each chassis side. FIGS. **10*a* and 10*b* show frontal cross-sectional views of the single overlap horizontal and vertical joints for connecting the segments of the chassis side. FIG. 10*c* shows the further inclusion of composite ribs in the chassis side. FIG. 10*d*** shows male pins and mating female sockets used to join the two segments of each chassis side.

Figure 11:
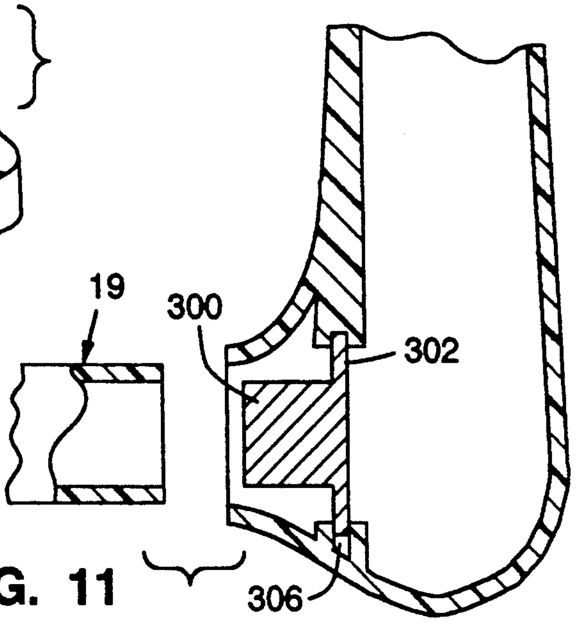

FIG. 11 is a cross-sectional view of the chassis showing a tongue and groove configuration for connecting a mounting boss for mounting a cross-bar to the chassis side.

FIGS. **12*a*–12*c*** show a method of joining a cross-bar into a recess formed in the chassis.

Figure 13:
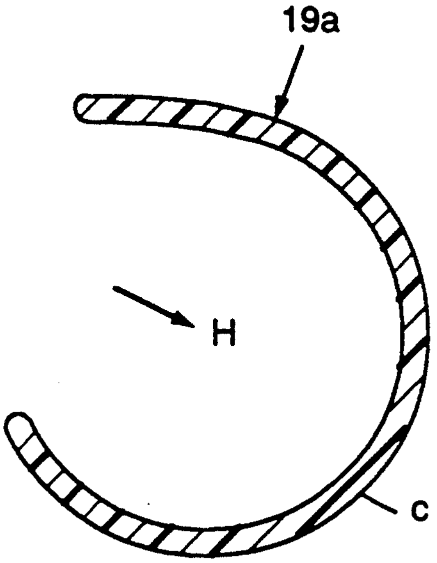

FIG. 13 is a sectional view of a hollow generally C-shaped cross-bar of the chassis.

Figure 14:
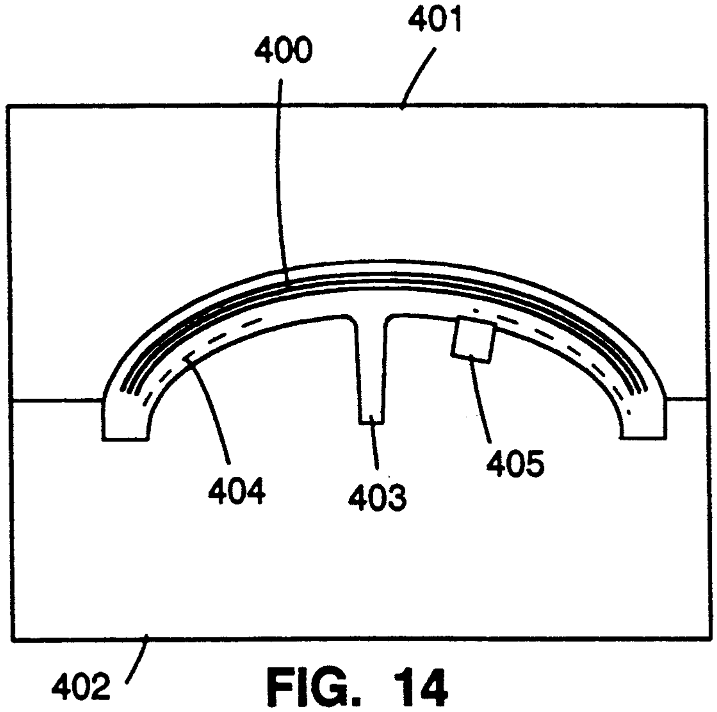

FIG. 14 is a cross-sectional view of a compression mold for forming the chassis from sheet molding compound.

FIGS. **15*a* shows formation of a preform by braiding on a mandrel, and 15*b*** shows an injection mold for forming the chassis using resin transfer molding.

FIGS. **16*a*–16*b*** are hand layup molding methods for forming the chassis.

FIGS. **17*a*–17*c*** are internal pressure methods for forming the chassis following the hand layup molding methods for forming the chassis.

Figure 18:
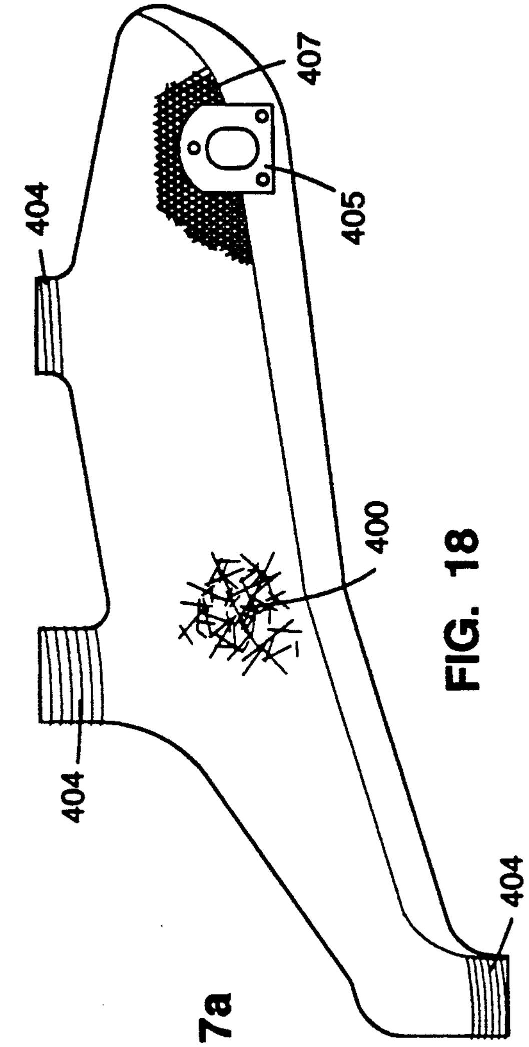

FIG. 18 is a side view of the chassis of the present invention showing an SMC charge, and prepreg tape and cloth reinforcement of the chassis.

Figure 19:
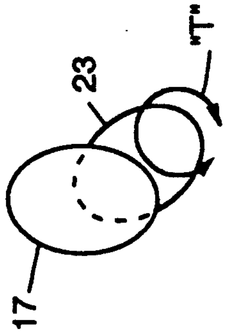

FIG. 19 is a front view of the radially offset arm portion of the chassis side, showing the locus of torsion resistance of the chassis arm.

DETAILED DESCRIPTION OF PREFERRED EMBODIMENTS

Figure 2:
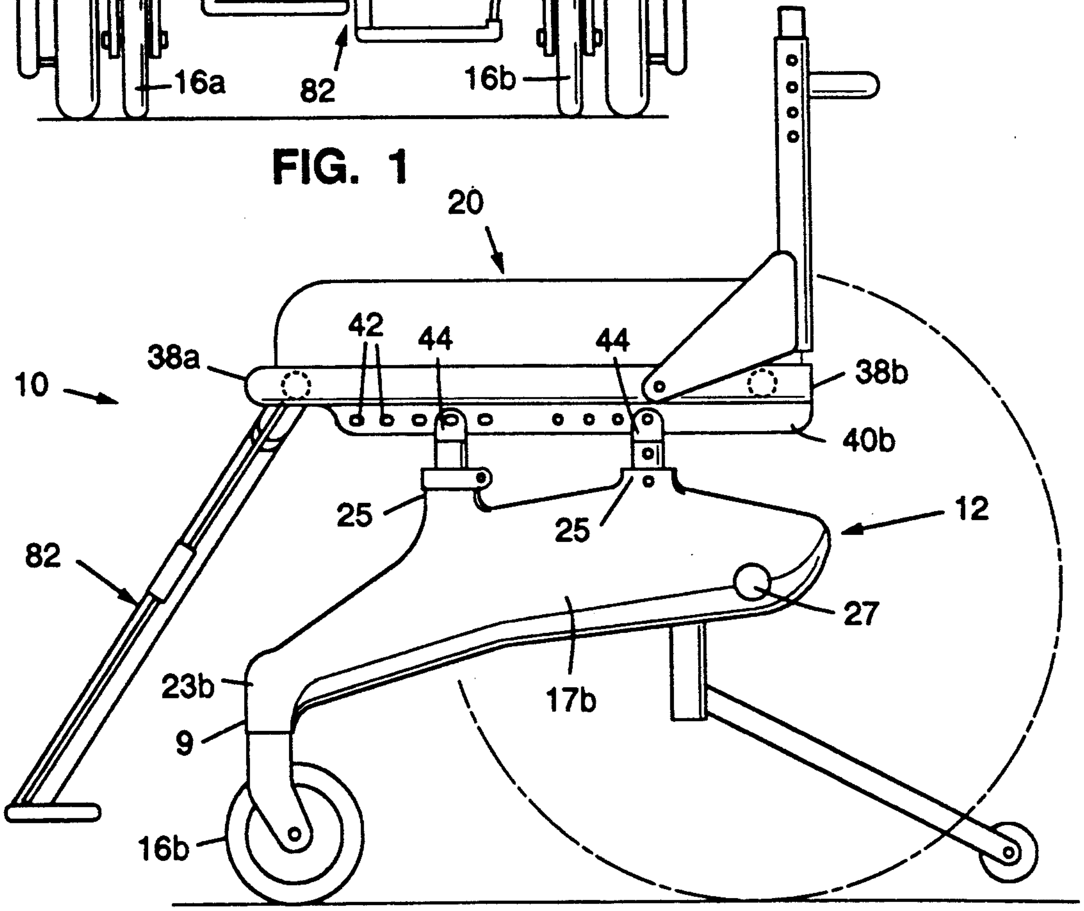
FIG. 2 is a somewhat diagrammatic side view in elevation of the wheelchair and chassis thereof, with the drive wheel shown in phantom outline for clarity.

Referring to FIGS. 1 and 2, the chassis 12 of the present invention is shown attaching additional components of the wheelchair 10, including two large drive wheels **14*a* and 14*b*, a seating system 20, a leg rest assembly 82, and casters 16*a* and 16*b***. Additional, optional equipment includes travel wheels (not shown), anti-tip wheels and wheel locks, and a variety of specialized seats.

In accordance with the principles of the present invention, the generally hollow or foam filled, wheelchair chassis 12 is constructed from composite material using molding techniques, preferably compression molding using a sheet molding compound or resin transfer molding. The chassis includes two longitudinal sides and each side may be of one or two-piece construction from a variety of composite materials and may be tailored to preselected shock and vibration attenuating specifications. All surfaces are contoured to provide a rounded, snag free, smooth, aerodynamic and streamlined appearance to the chassis 12.

For compression molding using sheet molding compound (SMC), each of the chassis sides is preferably formed in two portions from a composite material containing 25% to 80% by volume fiber, resin and filler. The chopped fiber to be used is generally from approximately ¼" to 3" in length. Longer fibers impart greater strength to the composite material, but do not flow as well into the complex contours or into the hollows for internal ribs. When longer non-flowing fiber is needed for reinforcement, preimpregnated continuous length cloth or uni-directional tape (prepreg) can be added locally to increase or tailor the strength, bending, stiffness, torsional characteristics, etc. of the part. The prepreg is added to the SMC charge in a predetermined amount, shape and location prior to closing the molds. When the charge is compressed in the mold, the prepreg and the SMC melt together to become a composite of short and long fibers held together by a solid, cured resin matrix. The prepreg is not used when it is not needed because it is more labor intensive and costly than the use of the SMC charge by itself. The SMC fibers and the fibers of the prepreg may be S-glass, E-glass, carbon, KEVLAR (tm), aramid, or other similar substances or combinations thereof. KEVLAR is a polyamide and a trademark of DuPont. The selected fiber or combination of fibers, is mixed with a resin of epoxy, polyester, vinyl ester, or other suitable substance. A glass bead, mineral, or other suitable filler is added to the SMC fiber-resin combination to form the sheet molding compound. The preferred sheet molding compound is a combination of ¼" to 3" carbon fibers, having approximately 65% fiber volume, with a vinyl ester resin and glass sphere filler. Referring now to FIG. 14, the prepared sheet molding compound 400 is placed in a compression mold constructed from composite material, aluminum, ceramic material, steel or another suitable substance. Presently, a chrome plated steel mold is preferred and consists of a mold top 401 and a mold base 402. The mold base 402 may be formed with cavities 403 for ribs or metal inserts to be molded into the chassis side. The mold for each chassis side may be unitary, or in the preferred method, may consist of two portions to form each longitudinal side of the chassis. Referring now to FIG. 10 and 10*a*, the two-piece molds may be shaped so that the chassis side is formed by bonding an upper segment and a lower segment at a selectable, horizontal part line "a", or the molds may be a right segment and a left segment that are bonded together at a vertical part line "b", as shown in FIGS. 10 and 10*b*.

The top 401 and the base 402 of the molds are heated to temperatures of approximately 100 to 450 degrees Fahrenheit. The selected SMC charge is generally contained on plastic sheets, such as Mylar (tm), which are cut or stamped to the approximate shape of the mold. The sheets are placed into the mold so that approximately 80% of the mold is covered, and the plastic backing sheet is removed. The SMC may be added in layers to the desired thickness which is preferably 1/16" to 1". A representative sample of the preferred fiber, 65% carbon fiber volume ¼" to 3" random SMC charge, is shown in FIG. 18 as number 400. FIG. 18 also shows uni-directional impregnated tape or cloth 404 wrapped around the seat attachment post areas and the castor attachment area of the mold to an approximate thickness of 1/16". Impregnated cloth 407 may be added to the mold in the area used to attach the drive wheels. Preferably, continuous length carbon fiber cloth or tape is used to tailor the strength and stiffness of the chassis to preselected specifications. Metal parts or elements 405 of the chassis, such as the post clamping mechanisms, the caster wheel attachment mechanisms, and the mounting plate for the drive wheel mechanism, may be added to the molds and their point of attachment to the chassis reinforced with the impregnated cloth or tape so that these devices are molded into the chassis sides during the cure.

Figure 12A:
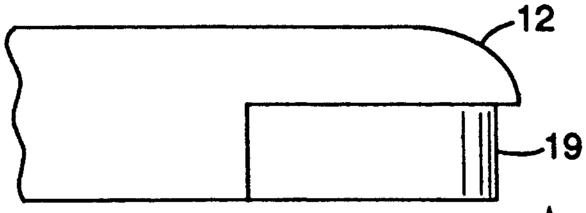
Figure 12B:
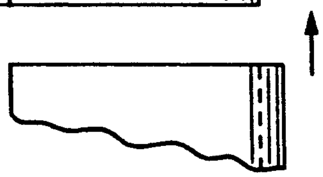
Figure 12C:
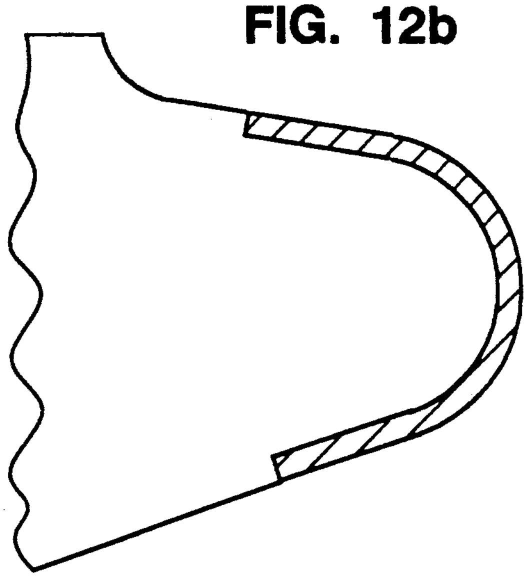

The sheet molding compound 400 is then placed onto the reinforced formed pattern of the mold base 402 in the predetermined quantity and shape. The mold top is next closed, the mold pressure is maintained at approximately 300 to 1000 psi and the selected temperature is maintained until the composite material has cured. Curing is presently accomplished in approximately 1 to 5 minutes. Following cure, the composite segments of each side are trimmed if needed and then are joined as shown in FIGS. 10*a*–10*d* by adhesive bonding. The bonding may use a single overlap joint fastening, as shown in FIGS. 10*a*–10*c*. Alternatively as shown in FIG. 10*d*, the segments may be joined by providing male pin devices 700 on one segment that attach within mating female sockets 701 provided on the other segment of the chassis side. The pin 700 and socket 701 attachment method may be provided at any of the attachment areas of the chassis segments or unitary sides. A preferred tongue and groove attachment for a mounting boss 300 may be provided as shown in FIG. 11 for attaching a cross-bar 19 to the chassis sides. The metal or composite mounting boss 300 includes flanged shoulders 302 which fit into the grooves 306 formed in the chassis segments, and the cross-bar 19 is mounted onto the mounting boss 300. The cross-bar 19 may also be joined to the chassis 12 by bonding it into a recess as shown in FIGS. 12*a*–12*c*. As shown in FIG. 10*c*, one or more shell reinforcing ribs 301 made from composite material may also be added to each side segment and bridged to the other side segment to provide strength and additional gluing points for bonding each side segment together. Pins 700 and sockets 701 may also be included in the reinforcing ribs 301, as shown in FIG. 10*d*. Other metal inserts may be bonded into the formed chassis. Foam may be added to the chassis's generally hollow sides to quiet the ride through resonance reduction, or to add strength. Compression molding using a SMC charge is known in the art to be applicable to volume production and is therefore preferred when the chassis of the present invention is manufactured in quantity.

Resin transfer molding is the preferred method of manufacture for small numbers of the chassis of the present invention. For resin transfer molding (RTM), each chassis side can be made in one or two pieces. With RTM, a dry fiber reinforced preform over a foam core, blank or mandrel is placed into the bottom half of a two part heated mold. The mold is then closed with the top and a catalyzed low viscosity resin is pumped in under pressure displacing the air until the mold is filled. The chassis part cures in the mold in 10 to 20 minutes. The part is then removed and trimmed if necessary. The fibrous preform can be made of E-glass, S-glass, carbon, aramid, or any combination thereof. The preform can be made of short fiber and adhesive blown together onto a mandrel, or continuous fibers wound around a mandrel, or continuous fibers braided over a mandrel, or cloth cut into pieces and loaded into the mold. Chopped fiber RTM production is cost effective and economically preferred. Braided RTM production is less cost effective, but results in a relatively stronger and lighter weight chassis. The mandrel is a form or mold shaped to conform to the inside contour of the part to be molded. The outer diameter of the mandrel corresponds in size and in shape to the inner diameter and shape of the desired, finished part. The preferred preform is made of a 60% to 70% fiber volume continuous length carbon fiber braided over a skinned foam mandrel forming the chassis side in one piece. The chassis sides can also be molded in segments and bonded together, see FIGS. 10a and 10b.

To make the sides in one piece by RTM, a skinned foam mandrel is covered with the fibrous preform and loaded into a mold. The resin is pumped in and encases the fibers without being absorbed into the foam. The completed part has a lightweight foam core. With all preforms except that using chopped fiber, the fibers are arranged in layers with varying angles and thicknesses in a predetermined manner to tailor the strength and stiffness to selected requirements.

Figure 15A:
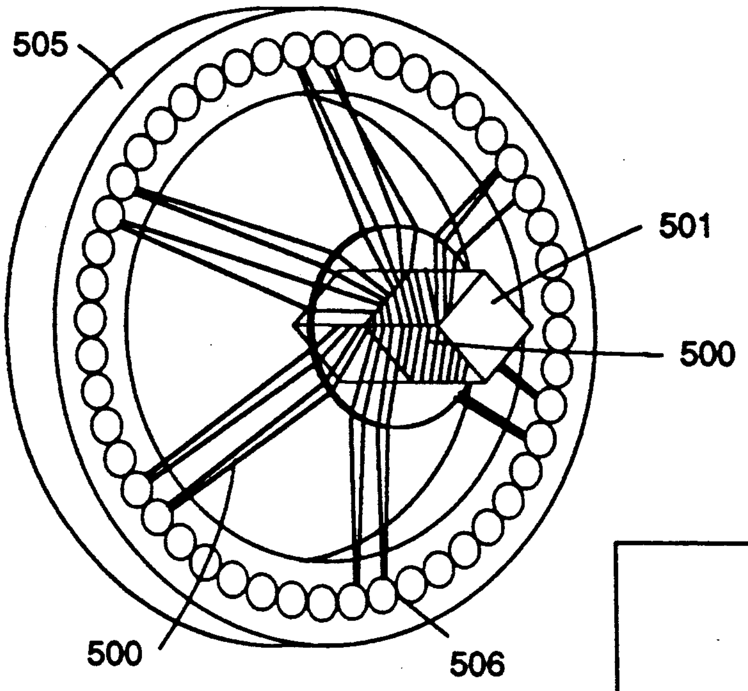

Referring now to FIG. 15a, the preferred preform 500 is braided over and around a skinned foam mandrel form 501 having the desired shape of the inside contour of the chassis side and mounted on a braiding machine 505. The braiding machine 505 includes multiple yarn carriers 506 for dispensing the preform 500. The dispensed preform 500 is braided down and back along the mandrel form 501. The braided preform is added to and placed around the mandrel 501 to the desired thickness. Selected areas, such as the areas of each side to which the seat assembly and the drive wheel assembly will be attached, may be selectively reinforced by adding additional unidirectional tape or cloth under the braid. Reinforcement may also include altering the angle of application, relative to the axis of the chassis side, and the weave of the preform in high stress areas. The mandrel is encased in a manner that conforms to preselected chassis specifications.

Figure 15B:
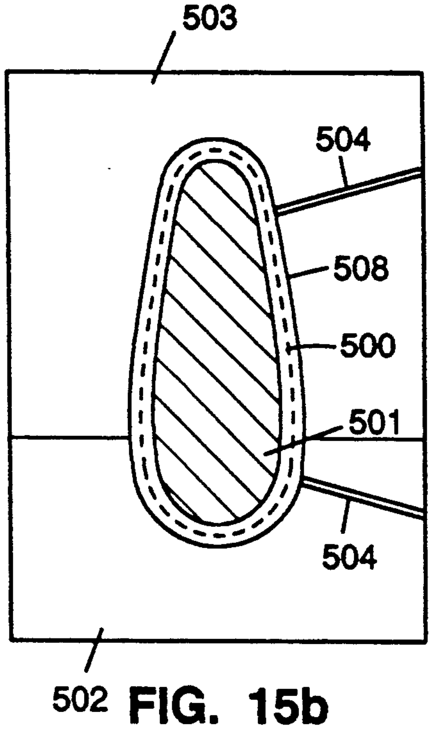

Referring to FIG. 15b, the encased mandrel 501 is next loaded into a mold having the contour 508 of the mandrel 501 and constructed from composite material, aluminum, ceramic material, steel or another suitable substance. Presently, a composite material mold is preferred and consists of a mold base 502 and a closable mold top 503. The mold is preheated to temperatures from approximately 100 to 450 degrees Fahrenheit. The top is closed over the mold base and a relatively flowable low viscosity resin is injected into the mold through one or more injection ports 504 in the mold, and at low pressure of approximately 100 psi. Epoxy resin is presently preferred, although polyester, vinyl ester or other suitable thermoplastic or thermosetting resins may be used. Following cure and cooling, the molded chassis side is removed from the mold, trimmed, and the desired metal parts or inserts, such as the snap mounts for the swivel caster wheels and the attachment mechanisms for the seating assembly and the drive wheels, are bonded to the side using epoxy or other suitable substances. Alternatively, the metal parts or inserts may be positioned into the prepared mandrel prior to injection of the resin.

The chassis sides may also be made in one piece using structural reaction injection molding (SRIM). A preform is made essentially as described above in connection with resin transfer molding; however, the fiber volume is less than the fiber volume employed in resin transfer molding. The preform is formed over the mandrel and the mandrel is placed into the heated mold and a higher viscosity resin is injected under low pressure. The chassis sides cure in the mold. The difference between SRIM and RTM is that the SRIM uses a faster curing higher viscosity resin and is therefore preferred for volume production. To aid the flow of the resin or to increase the fiber volume, the mold can be left open initially when the resin is pumped in so that the resin has more room to flow. Once the preform is almost covered, the mold is closed and the part cured.

Figure 16A:
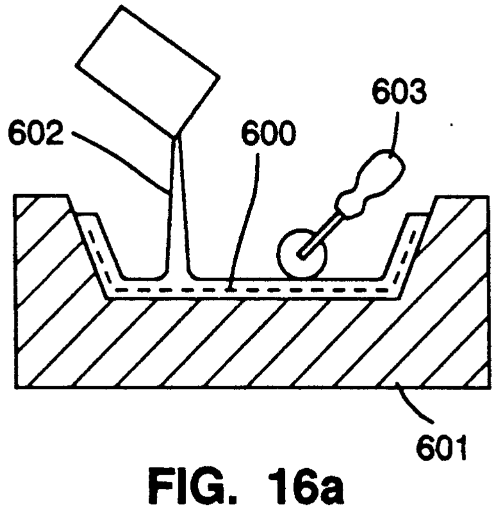
Figure 16B:
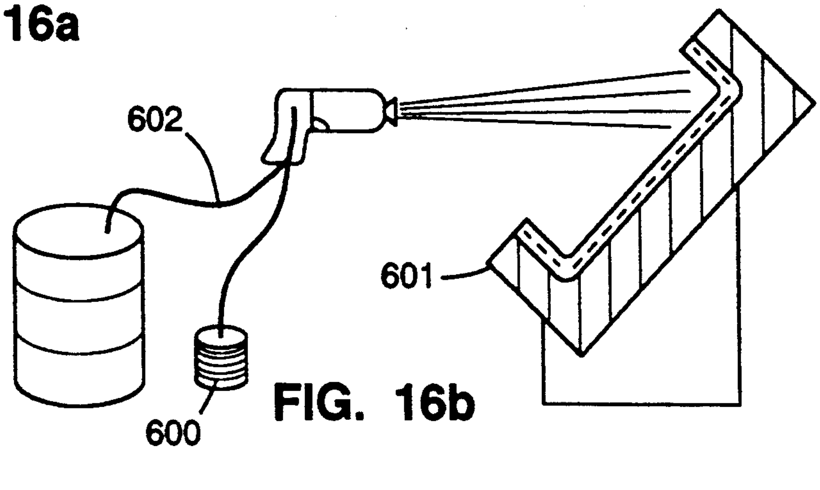

Each chassis side may also be formed in one piece using hand layup techniques as shown in FIGS. 16a–16b. The dry selected fiber or combination of fibers 600 is placed into an open mold 601 and the selected resin 602 is poured, brushed or sprayed over the fiber. External pressure can be applied by rollers 603 or other compaction devices or vacuum bags to press out trapped air and to compact the fiber resin mixture. Alternatively, the fiber and resin may be premixed and sprayed into the mold as shown in FIG. 16b, or a preimpregnated fiber cloth or tape may be pressed into the mold or onto a foam form. The hand layup techniques can be room temperature or oven cured.

Figure 17A:
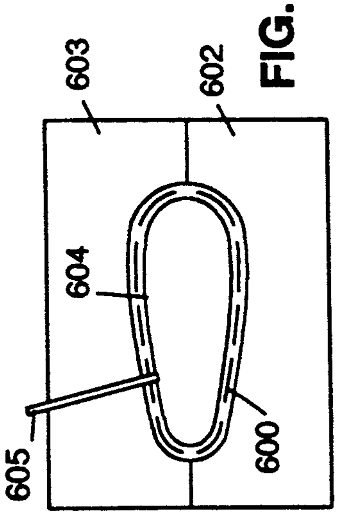
Figure 17B:
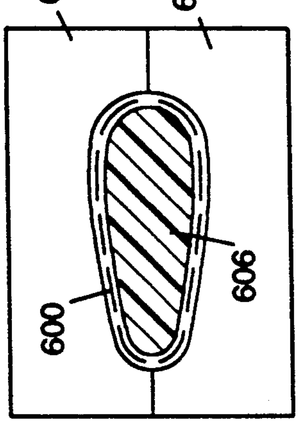
Figure 17C:
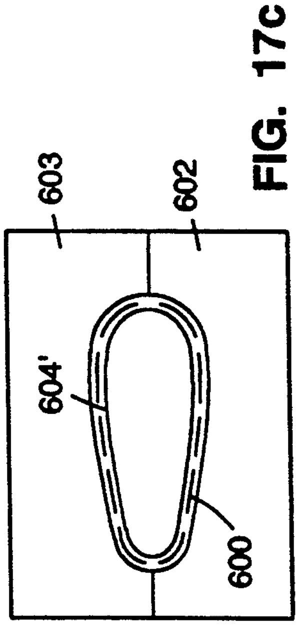

Internal pressure may be applied to hand layup molding techniques by using an inflatable bladder 604 or balloon, as shown in FIGS. 17a–17c. Following placement of the fiber or prepreg 600 in the mold 602 and addition of the resin, the air bladder 604 is placed over the mixture and inflated through an external port 605 to compress the mixture to the mold. The bladder 604 or balloon is formed from a flexible film or a plastic material and contains a nipple and valve (not shown) for injecting the air. A sealed bladder 604' can also be used as shown in FIG. 17c, and is filled with a predetermined amount of a gas that expands to give the desired internal pressure when heat is added to the mold for curing the part. Alternatively as shown in FIG. 17b, the sides may be foam filled with a heat expandable resin foam 606.

The one piece chassis side is a unitary structure without joints. Metal parts or elements may be molded into the sides, the sides may be filled with foam or other suitable substances, and protrusions, as shown in FIG. 11, may be formed in the sides to serve as attachment and bonding points for the cross-members. Additionally, one or more shell reinforcing ribs 301 made from composite material may be molded in, or added after cure, and bridged across the hollow interior of the chassis side to provide additional strength and gluing points. In addition, the ribs 301 may be used as attachment and positioning points for metal inserts.

The chassis 12 formed from composite material defines two longitudinal side rails 17a and 17b connected by at least one cross-bar 19a and 19b. The anterior ends of side rails 17a and 17b define forwardly and downwardly extending torsion arms 23a and 23b. Two swivel-mounted casters 16a and 16b are conventionally attached by snap-locks or similar devices to sleeves 9 of the arms 23a and 23b, and are thereby positioned anterior to the drive wheels 16a and 16b. The sleeve portion 9 of the arms 23 extends below the plane of the sides 17, and the composite material in the arms 23 provides known vibration and shock attenuating functions for the wheelchair. The composite material of chassis 12 causes the flexible and resilient arms to yield slightly under a vertically directed impact. The arms 23 individually react to impact and may strain and flex slightly to maintain the alignment of the upper frame portion of the chassis formed by the cross-bars 19 and the sides 17.

Composite materials are known to be lightweight, strong, resilient, corrosion-resistant and moldable. The amount of resilience can be preselected during manufacture using techniques well established among those skilled in the art of composite materials. For example, the chassis may be formed from fiber-resin unidirectional tape of a selected fiber composition, alignment and density thereby preselecting the shock attenuating properties of the chassis for a predetermined impact direction. The chassis sides 17 and cross-bars 19 are hollow or foam filled shells thereby creating a lightweight chassis having the option of including hollow spaces for stored components, such as drive motors. Referring to FIG. 13, a generally C-shaped rear cross-bar 19*a* is shown in cross section having a shell "c" and defining an interior hollow space "h" which may be fitted with two battery powered drive motors (not shown) for independently driving the drive wheels 14. Alternatively, the cross-bars may be made of metal.

Figure 3:
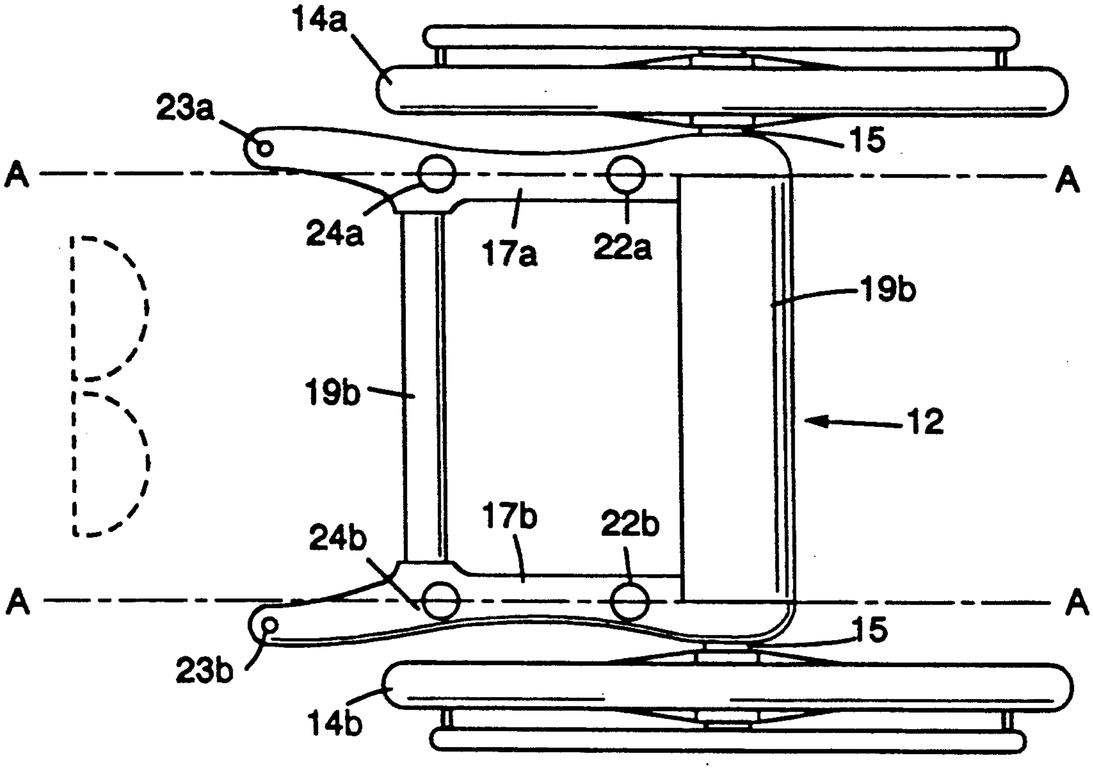
FIG. 3 is a top plan view of a chassis of the present invention and the drive wheels of the FIG. 1 wheelchair with the seating system removed. The foot rests are shown in phantom to provide orientation in this view.

The position of the arms 23 in relationship to the longitudinal sides 17 may be preselected to create an acute angle from approximately 5 degrees to 20 degrees. The angle makes it easier to closely approach the seat of the wheelchair; and, the acute angle forms a space between the arms and underneath the chassis and seat. The space may be used for storage or for wheel chair auxiliary equipment such as a power supply or other electronic components. The arms 23 are anterior to the cross-bars 19 and are self-supporting. The space created by the anterior self-supporting arms enables the leg rest assembly of the wheelchair to be adjusted and positioned throughout the space so that the user's knee angle may be adjusted, the seating assembly may be closely approached, and the leg rest assembly may be folded through the space and positioned beneath the seating system. In addition, the arms 23 are offset radially from the centerline "A" of the sides 17 as shown in FIG. 3. The composite material of the arms may be tailored to selected specifications for lateral and vertical deflection under impact. Lateral deflection may be tailored to approximately zero to 10 degrees, and vertical deflection may be tailored to approximately ½ to 10 degrees. Vertical deflection is measured from a 90 degree angle from the anterior-most cross-bar to the caster attachment point of the arm. The torsion arms 23 limit rotation of the arms under stress thereby maintaining wheel alignment. As shown in FIG. 19, the radially offset arm 23 has a locus of torsion resistance shown at arrow "T". Rotation of the arm under stress may be independently tailored and limited to approximately zero to 10 degrees.

The overall length of the longitudinal side 17, including the arm portion 23, may be from approximately 8" to 24" and is measured from the pivot axle of the attached caster wheel at the sleeve 9 to the drive wheel axle attachment point 27 on the chassis. The length may be preselected according to desired stability specifications with the ratio of the arm 23 length to the supported longitudinal side 17 length being approximately 55% and selectable from approximately 30% to 70%. The width of the chassis may be preselected and the length of the cross-bars accordingly adjusted from approximately 10" for a child's use to approximately 30".

The seating system 20 includes a generally rectangular frame 34 formed of two longitudinal side extrusions 36*a* and 36*b*, and two cross-members 38*a* and 38*b* respectively secured to the side extrusions at the front and rear of the frame 34. Two longitudinal mounting rails 40*a* and 40*b* extend downwardly from the side extrusions 36*a* and 36*b*. The rails 40*a* and 40*b* are preferably integrally formed with the side extrusions 36*a* and 36*b*, although the rails may be made separately and then secured, e.g. by welding, to the undersides of the side extrusions 36*a* and 36*b*. The rails 40*a* and 40*b* include a plurality of holes 42.

Figure 4:
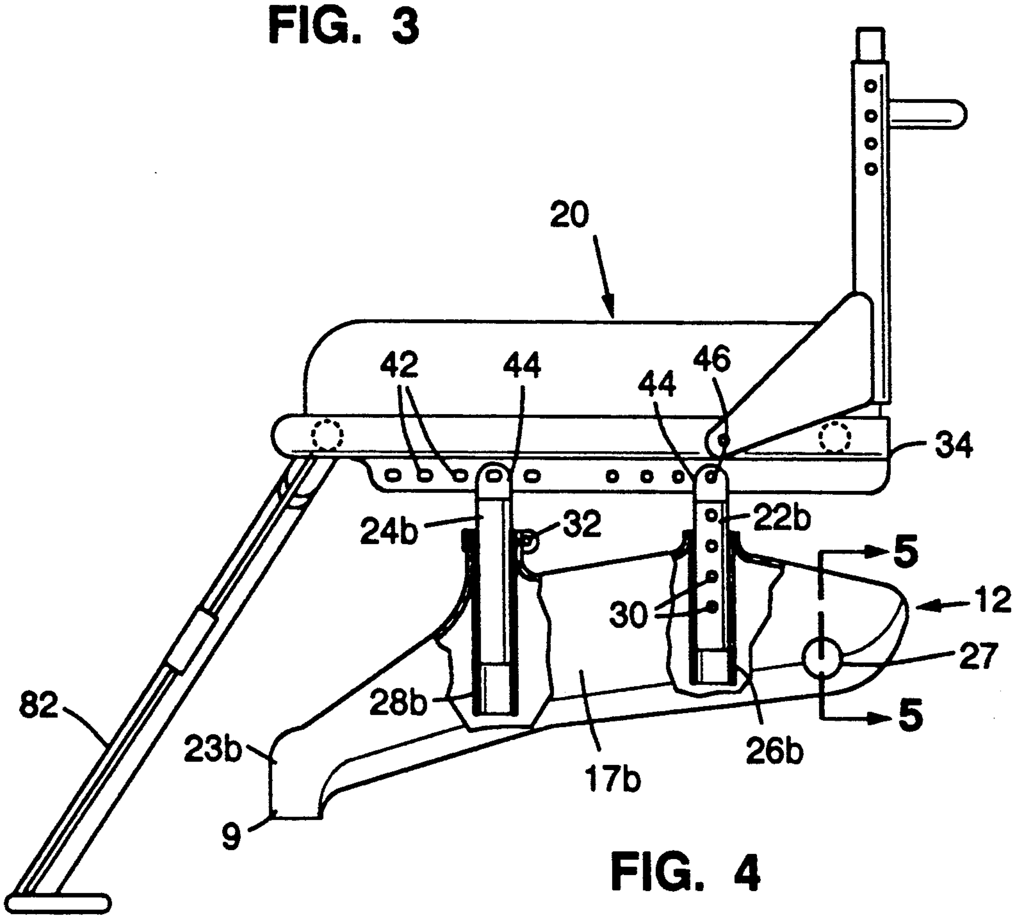
FIG. 4 is a somewhat diagrammatic side detail view in elevation and section of the FIG. 1 wheelchair showing the adjustable seat attachment mechanism of the chassis in greater detail.

The seating system 20 is demountably attached to the chassis 12 by four mounting posts: two rear posts 22*a* and 22*b*and two forward posts 24*a* and 24*b* which telescope upwardly from within the molded chassis structure 12. The rear posts 22*a* and 22*b* adjustably telescope along an upward locus within the two rear tubes 26*a* and 26*b* within the chassis 12, while the forward posts 24*a* and 24*b* telescope within two forward tubes 28*a* and 28*b* as shown in FIGS. 3 and 4. The four tubes 26*a*, 26*b*, 28*a*, and 28*b* each define an upper, annular neck portion 25.

The rear posts 22*a* and 22*b* may be set at progressively stepped heights by virtue of holes 30 and a transverse locking pin passing through a selected hole through the post 22 and a transversely aligned hole pair defined through the corresponding tube 26. The front posts 28*a* and 28*b* telescope throughout a continuous range. A pair of compression clamping mechanisms 32*a* and 32*b* compress the corresponding annular neck portion 25 of the tubes 28*a* and 28*b* about the corresponding posts 24*a* and 24*b* to lock the posts 24 at the desired height. A levered release nut (not shown) enables the clamping mechanism 32 to be released and the post 28 to be adjusted. In this manner, the height of the seating system 20 relative to the drive wheels 14*a* and 14*b* may be easily and readily established, in order to provide an adjustment of the seat height relative to the chassis 12 to take into account the length of the user's arms. This is important in order to provide a comfortable, effective driving relationship between the user's hands and arms and the drive wheels 14, so that the user may efficiently provide the motive force to drive the drive wheels 14*a* and 14*b* and thereby propel the wheelchair 10. It will be recognized by those skilled in the art that the height of the front posts may be secured with compression clamps, the height of the rear posts may be secured with compression clamps, the height of the rear posts may be secured with pins, or that clamps or pins may be used throughout.

The angle of the seating system 20 relative to the chassis 12 (and to the generally horizontal surface over which the wheelchair 10 is propelled) may also easily be adjusted by height adjustment of the forward posts 24 relative to the rear posts 22.

The rail 40*a* is adjustably attached to the mounting posts 22*a* and 24*a*, and the rail 40*b* is adjustably attached to the mounting posts 22*b* and 24*b*. While there may be a virtually unlimited number of longitudinal attachment positions of the seating system 20 by the rails 40, five positions are shown in FIGS. 2 and 4 by virtue of transverse holes 42 defined through the rails 40*a* and 40*b*. Each mounting post 22 and 24 includes a generally U-shaped mount 44, and a releasable locking pin 46 passes through the U-shaped mount 44 and into a selected mating hole 42 on the seating system 20. A locking nut 47 may be used with the locking pin 42, (see, e.g. FIG. 10) or the locking pin 42 may be self-contained with an expansion collet or projection end. (Such self locking pins are in common, widespread use in rigging of sailboats.) In this manner, the seat pan angle and the center of gravity of the user may be adjusted relative to the chassis 12 and its fixed wheelbase between the drive wheels 14 and the casters.

Figure 5A:
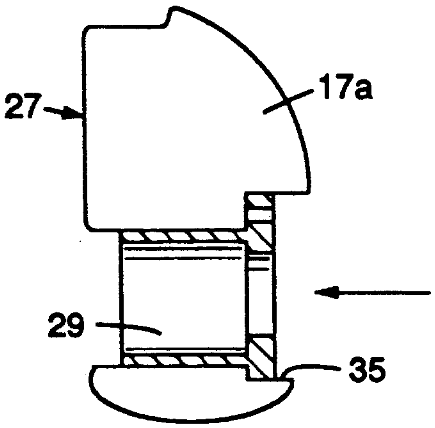
FIG. 5*b* is an enlarged side view of the interior of the chassis wheel attachment mechanism.
FIG. 5*c*** is an enlarged side view of the interior of another aspect of the chassis wheel attachment mechanism.
Figure 5B:
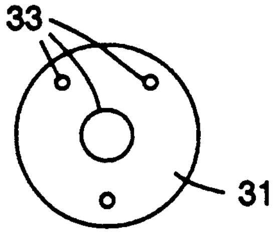
Figure 5C:
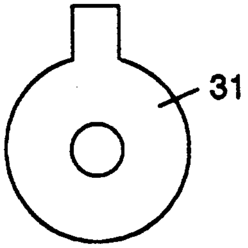
Figure 6D:
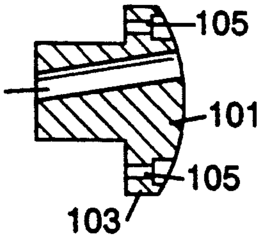

Referring now to FIGS. 5 and 6, a longitudinal sectional view of a drive wheel attachment mechanism is shown generally at 27. The attachment mechanism 27, one for each longitudinal side 17, is a cylindrical recess 29 within the outer surface of side 17. The cylindrical recess 29 initiates at a notched bracket portion 35 of the outer surface of contoured side 17, and terminates at a molded-in plate 31, shown in FIG. **5*b*, bearing a pattern of holes 33. A mating pattern of holes (not shown) are included on a wheel axle alignment plug 90 which is inserted into recess 29 for mounting the drive wheel axle 15. Alternatively, as shown in FIG. 5*c*, a keyway mechanism may be formed in the plate 31 for attaching the plug 90**.

Figure 6A:
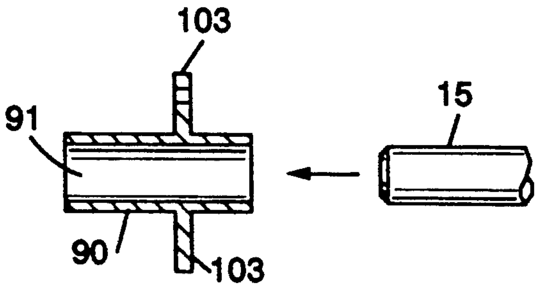
Figure 6B:
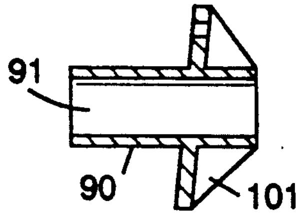
Figure 6C:
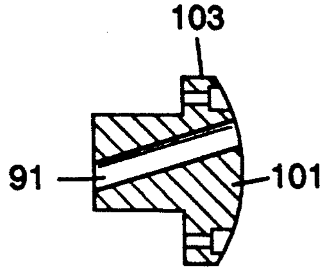

Referring to FIGS. **6*a*–6*d*, a number of interchangeable camber angle adjustment plugs 90 constructed by a variety of methods and embodying principles of the present invention are shown. The camber plugs are constructed by brazing or welding a formed bore 91 to a plate at a preset camber angle as shown in FIG. 6*a*, by drilling a bore 91 at a selected camber angle through a cast or machined block of a suitable substance such as aluminum, magnesium or plastic material as shown in FIG. 6*c*. Alternatively, the camber plugs may be molded from fiber reinforced material, or the fiber reinforced material may be cast around the positioned and angled bore, or the bores may be stamped directly into a plate. The preferred method of constructing the camber plugs 90 is by brazing or welding metallic, cylindrical formed bores at a variety of selected angles on to circular metallic plates bearing three mounting holes. The bores are positioned on the plate so as to compensate for any change in the wheelbase alignment caused by changes in vertical height from the axle to the ground when the camber angle is changed. The bores 91 in the plugs 90 are positioned so as to compensate for the difference in vertical height of the wheel when it is angled. The different angles selected for placement of the bores 91 enable the camber angle of the drive wheels 14** to be selected for particular user activities, including sports activities such as racing. A preselected pair of camber plugs providing for a tow-out of the drive wheels may be provided and is particularly useful for sports activities.

Referring now to FIGS. **5*a*, 6*a*, the method of alignment whereby the camber plugs 90 take up the vertical height difference when the wheel is angled, thereby maintaining a constant wheelbase, is demonstrated. For a non-cambered wheel the axle 15 is aligned with the plug 90, prior to attachment within recess 29 as shown in FIG. 6A. To provide a cambered wheel, the axle is inserted into a bore 91 placed at the selected camber angle while retaining the fixed wheelbase alignment as shown in FIG. 6*b*. A screw secures the plug 90 within the recess 29**.

One end of the stationary drive wheel axle 15 is mounted within the bore 91 of the plug 90, and the opposite end of the axle is snap-mounted within the wheelhub for rotation of the wheel. Conventional bearings are included within the wheel assembly for rotation of the wheels. The alignment plug 90 and the wheel mounting mechanism 27 together permit the camber of the drive wheels 14 to be easily adjusted without changing the wheelbase or the seat height. Smaller, travel wheels and anti-tip wheels may be mounted in a separate socket provided in each longitudinal chassis side. The alignment plug 90 and the wheel mounting mechanism 27 together permit the camber of the drive wheels 14 to be easily adjusted without changing the wheelbase or the seat height.

In another aspect of the present invention, the crossbars **19*a* and 19*b* are metallic or composite telescoping bars that are secured to the longitudinal sides 17*a* and 17*b* to form a unitary chassis 12**. The telescoping bars permit the user to adjust the width of the chassis. In this aspect, the cross bars of the seating system are also of adjustable width. Clamping devices are used to secure the selected position of the telescoping crossbars.

In yet another aspect of the present invention shown in FIG. 9, the mounting rails **400*a* and 400*b* for the seat assembly are molded as plates in the inside surface of the longitudinal side rails 170*a* and 170*b* of the chassis 120. The metallic plates 400 are bonded into the chassis 120 during its construction, or may be attached by rivets. A multitude of holes 421 are included to align with mating holes 421 in a seat bracket 425. The seat bracket 425 is secured to the rails 400 using quick release pins, or alternatively by conventional pins or bolts. As can be seen in FIG. 9, the seat bracket 425 and the rails 400 include holes 423 and 421, respectively, at differing heights thereby enabling the seat height to be adjusted. The plurality of longitudinally extending rail holes 421 additionally enables the lateral position of the seat to be adjusted thereby adjusting the center of gravity of the chair. The forwardly extending arms 230*a* and 230*b* form a preselectable acute angle with the longitudinal sides 170. In this embodiment, seating placement may also be adjusted by a seat shim 427. Bolt holes 429 are included for mounting to mating bolt holes 431 on the seat bracket 425. The seat shim 427** is exchangeable with other shims (not shown) thereby allowing shim angles to be selected from 0 to 12 degrees.

Although the presently preferred embodiment of the invention has been illustrated and discussed herein, it is contemplated that various changes and modifications will be immediately apparent to those skilled in the art after reading the foregoing description in conjunction with the drawings. For example, the contoured shape of the chassis may be modified to provide a different visual effect, and the chassis may be padded by bonding rubber 7 or elastomeric urethane to the underside, as shown in FIG. 10. The bonded material serves as protection to the composite chassis and also may be colored for visual effect. The chassis may be used to mount standard 24 inch pneumatic wheels or any suitable wheel. The chassis may be used to mount a variety of seating systems including a one piece composite seat system for sports or shower usage. Accordingly, it is intended that the description herein is by way of illustration and should not be deemed limiting the invention, the scope of which being more particularly specified and pointed out by the following claims.

What is claimed is:

1. A wheelchair assembly comprising:

two molded longitudinal side portions formed of composite material, one end of each side portion including a molded-in means for receiving a caster assembly;

at least one bridge member connecting said side portions to each other;

said two molded longitudinal side portions each having molded-in means for receiving a drive wheel axle assembly, said means for receiving being disposed on an outer side of each of said side portions;

a seat assembly that includes a frame and at least two mounting members;

said two molded longitudinal side portions each having at least one molded-in opening for receiving one of the mounting members, said at least one opening being disposed at a top side of each of said side portions;

means for adjusting the longitudinal position of the seat assembly relative to the side portions so that the seat assembly can be located at one of a plurality of different longitudinally disposed locations relative to the side portions;

means for adjusting the height and the angle of the seat assembly relative to the side portions so that the seat assembly can be located at one of a plurality of different heights relative to the side portions and one of a plurality of different angles relative to the side portions; and said one end of each of said two molded longitudinal side portions being defined by an arm portion that is outwardly angled relative to an axis of the side portion such that said chassis has an increased expanse between each arm of said two side portions.

2. The wheelchair assembly according to claim 1, including a mounting boss extending from each side portion in the direction of the other side portion, said mounting bosses being adapted to receive the at least one bridge member.

3. The wheelchair assembly according to claim 1, wherein said means for adjusting the longitudinal position of the seat assembly relative to the side portions includes a rail extending from each side of the frame, each rail including a plurality of holes arranged along at least a portion of its length to permit each of the mounting members to be secured to one of the rails at one of a plurality of locations.

4. The wheelchair assembly according to claim 1, wherein said seat assembly includes four mounting members that comprise two forward mounting members and two rearward mounting members, each of said side portions having two molded-in openings, each of said molded-in opening receiving one of the mounting members, said mounting members being securable at different axial positions relative to the side portions to adjust the height of the seat assembly and the front mounting members being positionable at a different height relative to the rear mounting members to thereby permit adjustment of the angle of the seat.

5. The wheelchair assembly according to claim 1, wherein said means for adjusting the height and the angle of the seat assembly includes a plurality of longitudinally disposed holes passing through the mounting members.

6. The wheelchair assembly according to claim 5, including a compression clamp surrounding each of said molded-in openings for clamping the mounting members in place relative to the side portions.

7. A molded composite chassis for a lightweight modular wheelchair according to claim 1, wherein said two molded longitudinal side portions are each formed of two joined segments and said side portions each have a substantially egg-shaped cross-section.

8. A molded composite chassis for a lightweight modular wheelchair according to claim 1, wherein each of said two molded longitudinal side portions includes molded-in means for securing said side portions to said bridge member, said means for securing being disposed on an inner side of each side portion.

9. A molded composite chassis for a lightweight modular wheelchair according to claim 1, wherein said arm of each longitudinal side portion is outwardly angled from an axis of said longitudinal side portion at an angle between 5 degrees and 20 degrees.

10. A molded composite chassis for a lightweight modular wheelchair comprising:

two molded longitudinal side portions formed of composite material, one end of said side portion including a molded-in means for receiving a caster assembly;

at least one bridge member connecting said side portions to each other;

said two molded longitudinal side portions each having molded-in means for receiving a drive wheel axle assembly, said means for receiving being disposed on an outer side of each of said side portions;

said two molded longitudinal side portions each having at least one molded-in cylindrical opening for receiving means for attaching a seat, said at least one cylindrical opening being disposed at a top side of each of said side portions; and, each of said two molded longitudinal side portions including molded-in means for securing said side portions to said bridge member, said means for securing being disposed on an inner side of each side portion and including a flanged cylindrical mounting boss disposed in at said inner side and extending within a generally circular opening in said inner side, said bridge member being insertable into said circular opening to engage said mounting boss.

11. A molded composite chassis for a lightweight modular wheelchair comprising:

two molded longitudinal side portions formed of composite material, one end of each side portion including a molded-in means for receiving a caster assembly;

at least one bridge member connecting said side portions to each other;

said two molded longitudinal side portions each having molded-in means for receiving a drive wheel axle assembly, said means for receiving being disposed on an outer side of each of said side portions;

said two molded longitudinal side portions each having at least one molded-in opening for receiving means for attaching a seat, said at least one opening being disposed at a top side of each of side portions; and each of said two molded longitudinal side portions including molded-in means for securing said side portions to said bridge member, said means for securing being disposed on an inner side of each side portion and including a mounting boss disposed at said inner side of each side portion and each mounting boss extending in the direction of the inner side of the other side portion, said bridge member being engageable with each mounting boss.

* * * * *